US012147832B2

(12) United States Patent
Vasudevan et al.

(10) Patent No.: US 12,147,832 B2
(45) Date of Patent: Nov. 19, 2024

(54) FRAMEWORK FOR PREVENTING CASCADING FAILURES ACROSS LAYERS OF A SYSTEM DUE TO SUBSYSTEM FAILURE

(71) Applicant: Microsoft Technology Licensing, LLC, Redmond, WA (US)

(72) Inventors: Nishand Lalithambika Vasudevan, Bothell, WA (US); Akshay Navneetlal Mutha, Sammamish, WA (US); Abhishek Anil Kakhandiki, Redmond, WA (US); Sathya Narayanan Ramamirtham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 427 days.

(21) Appl. No.: 17/541,180

(22) Filed: Dec. 2, 2021

(65) Prior Publication Data
US 2023/0176899 A1 Jun. 8, 2023

(51) Int. Cl.
*G06F 9/455* (2018.01)
*G06F 9/30* (2018.01)
*G06F 9/48* (2006.01)
*G06F 9/50* (2006.01)

(52) U.S. Cl.
CPC .......... *G06F 9/4875* (2013.01); *G06F 9/3009* (2013.01); *G06F 9/4881* (2013.01); *G06F 9/505* (2013.01)

(58) Field of Classification Search
CPC .... G06F 9/4875; G06F 9/3009; G06F 9/4881; G06F 9/505
See application file for complete search history.

(56) References Cited

U.S. PATENT DOCUMENTS

| 8,717,878 B2 | 5/2014 | Martinez et al. |
| 9,141,495 B2 | 9/2015 | Hsu-hung et al. |
| 10,318,335 B1 | 6/2019 | Toy |
| 10,949,211 B2 | 3/2021 | Memon et al. |

OTHER PUBLICATIONS

"Amazon ElastiCache FAQs", Retrieved From: https://web.archive.org/web/20110829072508/https:/aws.amazon.com/elasticache/faqs/, Aug. 29, 2011, 6 Pages.
(Continued)

*Primary Examiner* — Gregory A Kessler
(74) *Attorney, Agent, or Firm* — Workman Nydegger

(57) ABSTRACT

The handling of external calls from one or more services to one or more subservices is described. Upon detecting that a service has made an external call to a subservice and prior to allowing the external call to be sent to the subservice, a system evaluates the external call against one or more pre-call thresholds to determine whether or not the one or more pre-call thresholds are met. If the determination is that a pre-call threshold of the one or more pre-call thresholds is not met, the external call is failed without sending the external call to the subservice. This failing might include communicating to the service that placed the external call that the external call has failed. Otherwise, the system sends the external call to the subservice. By applying these thresholds, the service is kept from using too many resources.

20 Claims, 5 Drawing Sheets

(56) References Cited

OTHER PUBLICATIONS

Andrus, et al., "FIT: Failure Injection Testing", Retrieved From: https://netflixtechblog.com/fit-failure-injection-testing-35d8e2a9bb2, Oct. 23, 2014, 5 Pages.
Liu, et al., "Prevention of Fault Propagation in Web Service: A Complex Network Approach", In Journal of Web Engineering, vol. 14, Issue 1& 2, Mar. 8, 2015, pp. 136-150.
Nolan, Laura, "How to Avoid Cascading Failures in Distributed Systems", Retrieved From: https://www.infoq.com/articles/anatomy-cascading-failure/, Feb. 20, 2020, 14 Pages.

FRAMEWORK FOR PREVENTING CASCADING FAILURES ACROSS LAYERS OF A SYSTEM DUE TO SUBSYSTEM FAILURE

BACKGROUND

Web sites and other network services are configured to receive requests from a variety of client computing systems. Some network services (such as those belonging to a single enterprise) share computing resources, such as threads, storage, memory, processing time, and so forth. For instance, an enterprise may be a tenant on a public cloud, where they have subscribed to be able to use a certain amount of resources collectively across all of their services. In order to handle an incoming request, the network service may rely upon a variety of external services (e.g., a "subservice" or a "microservice"). To use a subservice, the service will make an external call to the subservice. The thread that places the external call then waits for a reply from the subservice. Upon receiving the reply, the thread resumes other operation.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with the principles described herein, the handling of external calls from one or more services to one or more subservices is described. Upon detecting that a service has made an external call to a subservice and prior to allowing the external call to be sent to the subservice, a system evaluates the external call against one or more pre-call thresholds to determine whether or not the one or more pre-call thresholds are met. As an example, a pre-call threshold might be a concurrency threshold limiting the number of simultaneously in-flight external calls that the service can make. As another example, a pre-call threshold might be an adjustable load shedding threshold that is based on the reliability of the subservice.

If the determination is that a pre-call threshold of the one or more pre-call thresholds is not met, the external call is failed without sending the external call to the subservice. This failing might include communicating to the service that placed the external call that the external call has failed. If the determination is that all of the one or more pre-call thresholds are met, the system sends the external call to the subservice.

By applying these thresholds, the service is kept from using too many resources when making an external call. Such excessive resource usage can occur when, for instance, the external call hangs without returning, or perhaps if the subservice is in a bad state that causes the service to use too many resources. Thus, the use of the thresholds causes the system resources to be shared well between multiple services. Furthermore, since the external call may be failed immediately without even sending the external call to the subservice, the service can be notified immediately that the external call failed, allowing the service to continue while handling that failure in a graceful way (instead of waiting for a failure that may never come). Furthermore, the subservice is spared an external call that may end up causing the subservice to hang or otherwise operate improperly. Thus, the system is kept from trying to perform tasks that will cause excessive system resources to be used by a single service, thereby causing the ecosystem of multiple services to operate much more harmoniously.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to technology that permits two computing systems to communicate with each other with high confidence that a particular entity is present at the other computing system. As an example, when a first computing system communicates with a second computing system, the first computing system may regularly verify that a particular entity is present at the second computing system.

In accordance with the principles described herein, the handling of external calls from one or more services to one or more subservices is described. Upon detecting that a service has made an external call to a subservice and prior to allowing the external call to be sent to the subservice, a system evaluates the external call against one or more pre-call thresholds to determine whether or not the one or more pre-call thresholds are met. As an example, a pre-call threshold might be a concurrency threshold limiting the number of simultaneously in-flight external calls that the service can make. As another example, a pre-call threshold might be an adjustable load shedding threshold that is based on a reliability of the subservice.

If the determination is that a pre-call threshold of the one or more pre-call thresholds is not met, the external call is failed without sending the external call to the subservice. This failing might include communicating to the service that placed the external call that the external call has failed. If the determination is that all of the one or more pre-call thresholds are met, the system sends the external call to the subservice.

By applying these thresholds, the service is kept from using too many resources when making an external call. Such excessive resource usage can occur when, for instance, the external call hangs without returning, or perhaps if the subservice is in a bad state that causes the service to use too many resources. Thus, the use of the thresholds causes the system resources to be shared well between multiple services. Furthermore, since the external call may be failed immediately without even sending the external call to the subservice, the service can be notified immediately that the external call failed, allowing the service to continue while handling that failure in a graceful way (instead of waiting for a failure that may never come). Furthermore, the subservice is spared an external call that may end up causing the subservice to hang or otherwise operate improperly. Thus, the system is kept from trying to perform tasks that will cause excessive system resources to be used by a single service, thereby causing the ecosystem of multiple services to operate much more harmoniously.

Figure 1:
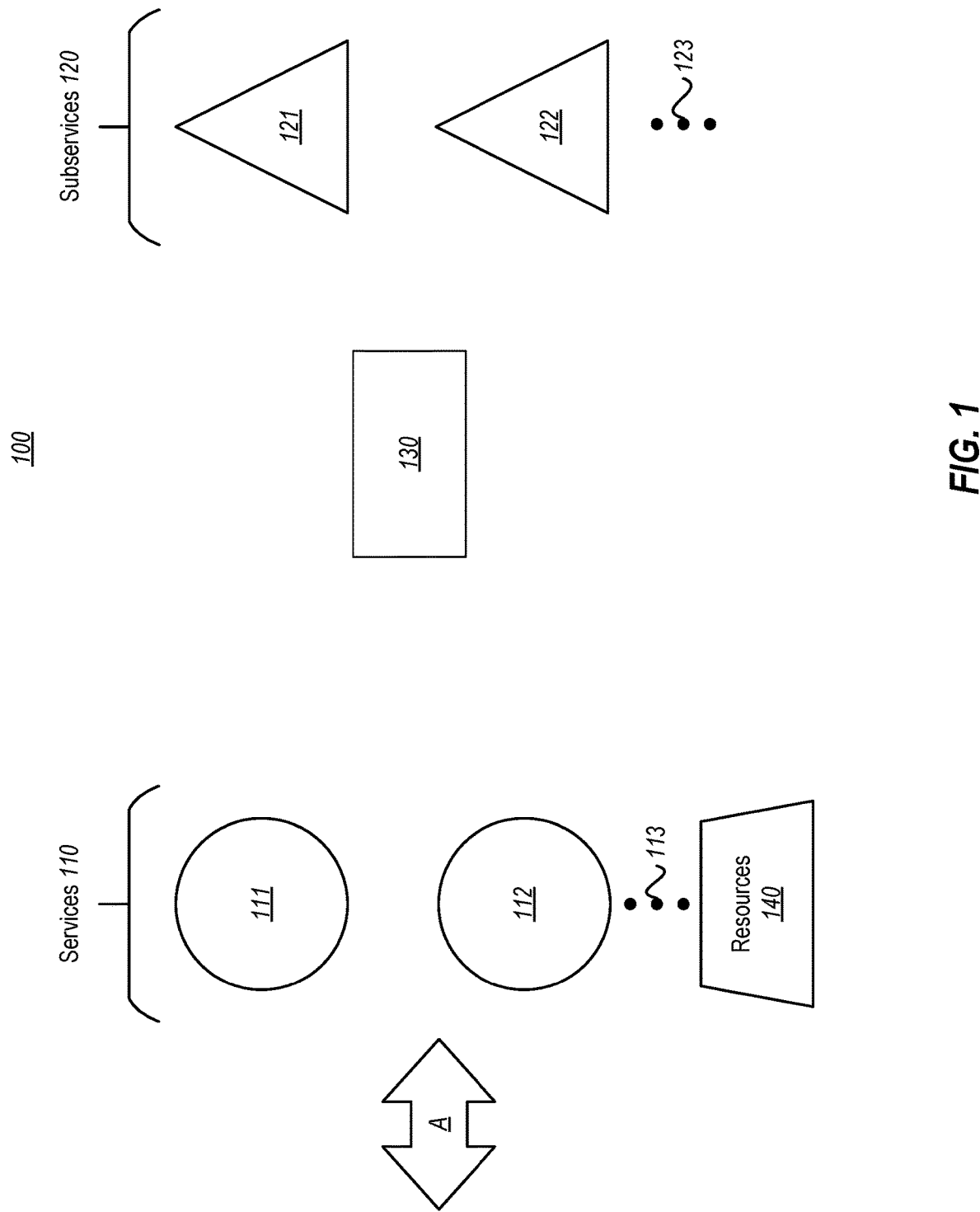
FIG. 1 illustrates an environment in which the principles described herein may be employed, and which includes services that field requests and process those requests by placing external calls to subservices, where the services share resources.

FIG. 1 illustrates an environment 100 in which the principles described herein may be employed. The environment 100 includes services 110 and subservices 120. In the illustrated environment 100 of FIG. 1, the services 110 include two services 111 and 112, but the ellipsis 113 represents that the environment 100 may include any number of services. Furthermore, the subservices 120 includes two subservices 121 and 122, but the ellipsis 123 represents that the environment 100 may include any number of subservices. The services 110 are each illustrated generally as circles. The subservices 120 are each illustrated as triangles.

As represented by bi-directional arrow A, the services 110 process incoming requests and as appropriate provides responses. In order to process the incoming requests, the services 110 make external calls to subservices 120. Furthermore, the services 110 consume resources 140 that are shared amongst all of the services 110. The handling component 130 intervenes between the services 110 and the subservices 120 so as to intercept at least some (and perhaps all) of external calls as they are made from each service to each subservice. The component 130 intervenes so as to promote careful sharing of the limited quantity of resources 140 available to the services 110 as a whole.

Figure 2:
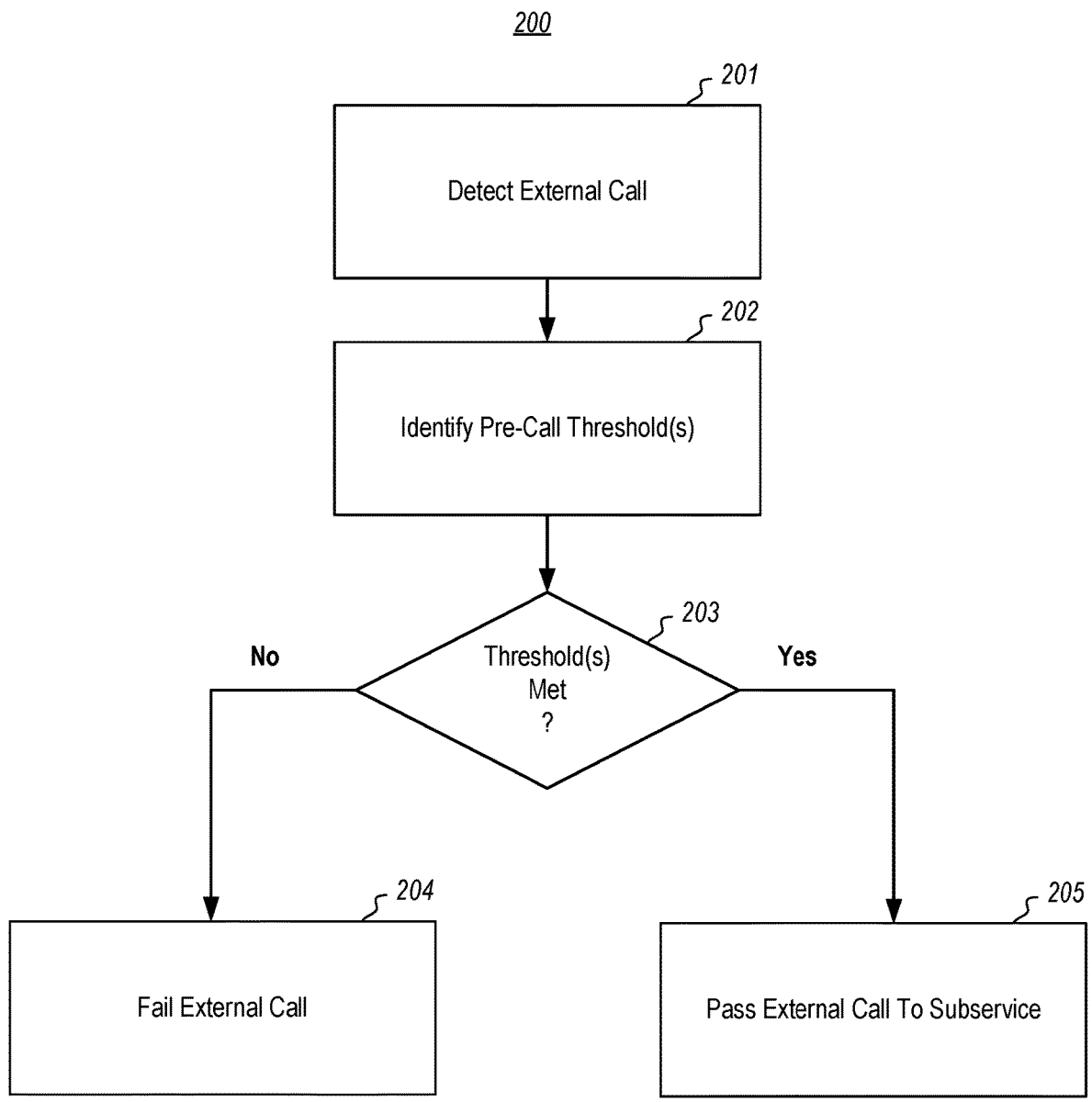
FIG. 2 illustrates a flowchart of a method for intervening between a service making the external call and the subservice to which the external call is addressed, in accordance with the principles described herein.

FIG. 2 illustrates a flowchart of a method 200 for intervening between a service making the external call and the subservice to which the external call is addressed. As the method 200 may be performed by the handling component 130 within the environment 100 of FIG. 1, the method 200 of FIG. 2 will now be described with frequent reference to the environment 100 of FIG. 1.

The handling component 130 may be instantiated/or operated by a computing system in response to one or more processors of the computing system executing computer-executable instructions that are present on a computer-readable media. These computer-executable instructions may be stored on a computer storage media as an example. If the computing system was structured as described below for the computing system 500 of FIG. 5, the handling component 130 may be structured as described below for the executable component 506 of FIG. 5.

The method 200 is initiated upon detecting receipt of an external call from a service to a subservice (act 201). As an example, in FIG. 1, suppose that in one example (called hereinafter the "main example"), the service 111 makes an external call that is addressed to the subservice 121. The handling component 130 would detect receipt of this external call. An external call is a call that is made to a component outside of the process that is making the call. The external call may be to a subservice that is local to the same machine (but in a different process) as the service, or may be to a different machine. The subservice is thus an external dependency of the calling service.

The method 200 then includes identifying the one or more pre-call thresholds that are to be applied to the external call (act 202). These pre-call thresholds are related to the usage of the resources shared by all services in the system. In the environment 100 of FIG. 1, the pre-call thresholds are designed to ensure careful sharing of the resources 140 amongst the services 110.

As an example, the one or more pre-call thresholds may include a concurrency threshold limiting a number of pending external calls that the service can make. In the main example, this threshold could limit the number of simultaneous external calls that the service 111 can make. Here, "simultaneous" external calls are external calls that have been placed, but which are not yet responded to. That is, the simultaneous external calls are simultaneous in that they are in-flight at the same time. The term does not imply that the external calls were initiated at the very same instant in time. As another example, the one or more pre-call thresholds may include a load threshold based on the reliability of the subservice. In the main example, this threshold is based on the reliability of the subservice 121. As the reliability of the subservice 121 decreases, the load threshold decreases. Conversely, as the reliability of the subservice 121 increases, the load threshold increases.

The method 200 then includes evaluating the external call against one or more pre-call thresholds to determine whether or not the one or more pre-call thresholds are met (decision block 203). This evaluation is performed by the handling component 130 of FIG. 1. As an example, in the case of there being two pre-call thresholds—one being the number of pending external calls that the service can make and one being a load shedding threshold that is based on the reliability of the subservice—the handling component 130 will check whether or not the service would still be within the number of simultaneously in-flight external calls if the external call is made, and whether or not the load threshold would be exceeded if the external call is made on. As an example of the load threshold, the handling component could check the failure rate of the subservice within a recent time window (e.g., of several minutes) to determine whether or not to make the external call.

If the determination is that a pre-call threshold of the one or more pre-call thresholds is not met ("No" in decision block 203), the handling component 130 fails the external call without sending the external call to the subservice (act 204). This failing involves returning a failure message to the service that placed the external call. Thus, in this case in the main example, the handling component 130 would send a failure message to the service 111 without ever having even sent the external call to the subservice 121. Thus, when a pre-call threshold is not met, the service that placed the call finds out very quickly that the external call failed.

As an example, if the service tried to make an external call that would cause it to exceed the number of simultaneously in-flight external calls permitted for that service, the external call would fail immediately without even placing the external call to the subservice. Alternatively, or in addition, if the service tried to make an external call that would cause the load shedding threshold to be exceeded, then the external call would fail immediately without placing the external call to the subservice.

On the other hand, if the determination is that all of the one or more pre-call thresholds are met ("Yes" in decision block 203), the external call is sent to the subservice (act 205). In this case in the main example, the handling component 130 would send to the subservice 121 the external call that was placed by the service 111. While the principles described herein apply if there are multiple pre-call thresholds, the principles described herein also apply if there is but a single pre-call threshold. Thus, the phrase "all of the one or more pre-call thresholds" simply means "the pre-call threshold" in the case of there being only a single pre-call threshold.

Since the thresholds relate to resource usage within the environment, the resources shared by the services are more carefully allotted. As an example, a pre-call threshold limiting the number of pending external calls that a service can make will put an upper limit on the number of threads that will be used by a service. For instance, if an external call is placed and allowed to pass to the subservice, the external call might take too long to process by the subservice. If this repeats for other calls from that same service, ultimately there will be a larger number of pending external calls that will waste threads that could be more beneficially used by other services. Accordingly, by limiting the number of pending threads to be well above what the service should normally be using, the collection of services as a whole is protected against any one service taking up too many of the available threads simply waiting for a reply.

As another example, a pre-call threshold that is based on a recent failure rate of the subservice (i.e., the load shedding threshold) will prevent a subservice from slowing down due to being overwhelmed with external calls, which can bog down the subservice and even potentially cause the subservice from operating at all. If the system notices a problem with a particular subservice processing external calls, the system can scale back the number of calls made to the subservice. On the other hand, as time passes on the assumption that the subservice problem is transient, the system could decide to gradually and carefully increase the number of calls made to the subservice. Thus, this pre-call threshold prevents service from contributing to reliability problems of the subservice.

Take, for instance, an authentication service that uses a token subservice to verify tokens. Pre-authenticated services do not have to be fielded by the authentication service. However, some requests that are not pre-authenticated are fielded by the authentication service, which uses the token subservice to aid in performing authentication. Now suppose that the token subservice is not operating properly, meaning that it takes a long time to get a response from the token subservice. Without limits, this might cause there to be a lot of external calls from the authentication service to the token subservice that are just waiting around for a reply. Thus, the waiting threads are being used to simply wait for a reply. This would limit the number of threads available for other services within the system. And other services might find themselves without sufficient threads to operate optimally. This is one example of the type of problem that the principles described herein can mitigate or solve.

The method 200 may be repeated for any number of external calls. Some pre-call thresholds may be adjusted dynamically, such as the limit in the number of external calls that a single subservice should handle. Some pre-call thresholds may be set at different values depending on the service. After all, during normal operation, different services can be expected to use different amounts of resources. Thus, depending on the normal usage of a service, and the variability that can normally happen in usage by each service, the pre-call thresholds may be set differently to make sure that the pre-call limits really are only relatively infrequently encountered and only when there is high confidence that there is abnormal operation.

Figure 3:
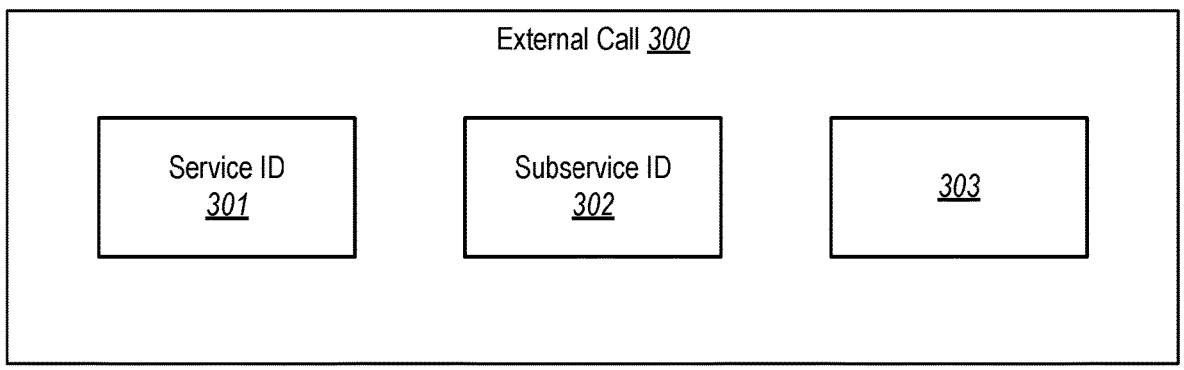
FIG. 3 schematically illustrates a structure of an external call that includes a service identifier, a subservice identifier, and a construct that notifies whether or not the method of FIG. 2 is to be applied to the external call.

Thus, in one embodiment, the identification of the one or more pre-call thresholds (act 202) is based on an identity of a service that made the call. As an example, FIG. 3 illustrates an external call 300, which includes a service identifier 301 that identifies the service that placed the external call, as well as a subservice identifier 302 that identifies the subservice that is the target for the external call. In the main example, the service identifier 301 would identify the service 111, and the subservice identifier 302 would identify the subservice 121.

As previously stated, the method 200 may repeat any number of times whenever an external call is made. For example, if the service 111 were to make a call to the same subservice 121 again, then the handling component 130 would again perform the method 200. Note, however, that the pre-call thresholds may have been adjusted from the prior time that the method 200 was performed for the same service 111 and subservice 121. Nevertheless, the method 200 would indeed be performed again on the pre-call thresholds.

Similarly, if the service 111 were to make an external call to a different subservice 122, the handling component 130 may again perform the method 200. Note that the pre-call thresholds may again be different due to the passage of time, and due perhaps to the fact that a different subservice 122 is the target of this newer external call. Also, if the service 112 were to make an external call to a subservice, the method 200 may be performed. Note that the pre-call thresholds may be different due to the passage of time, and due perhaps to the fact that there is a different service 112 that is making the external call.

By failing external calls that are inappropriate given the need to share resources amongst all services, the shared resources of the services are better spent. That is, external calls that hang due to a subservice being unavailable, non-functional, or having reduced function (temporarily or not) are made not to be excessive. Thus, such problematic external calls do not propagate problems into the performance of the system as a whole. Instead, such problems are contained.

Furthermore, because the thresholds are pre-call thresholds, the external call can fail without even placing the external call to the subservice. Thus, the external calls can fail immediately. Now the fact that an external call failed is certainly not ideal. But if an external call is going to fail or going to harm the system as a whole, it is better that the external call fail immediately. This allows the service that made the call to work around the failure immediately. As an example, services often have exception handling capability that allows the software to handle an exception. But in order for that exception handling capability to begin working, there must first be an exception. Thus, the rapid communication of a failure of the external call does help the service that made the external call make progress.

Figure 4:
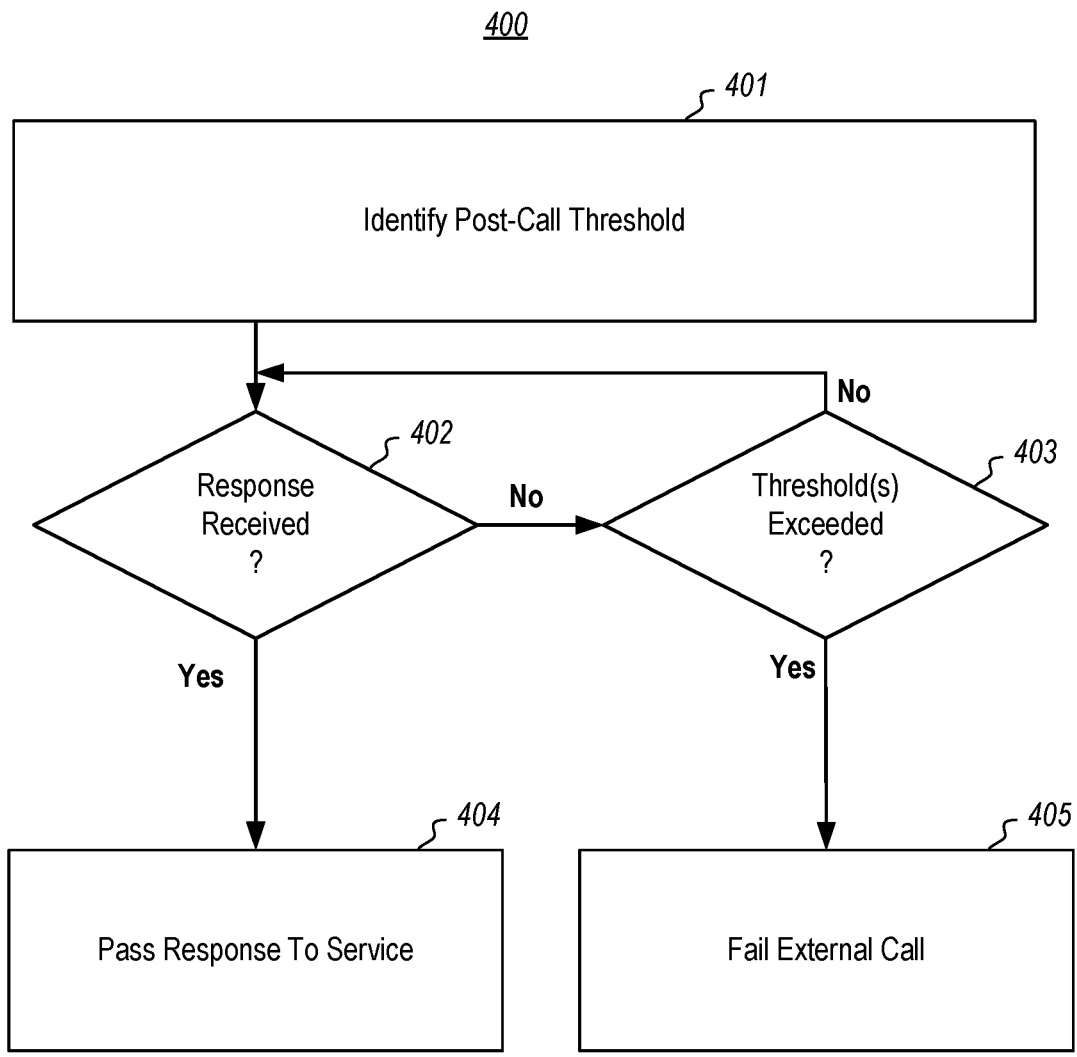
FIG. 4 illustrates a flowchart of a method for enforcing post-call thresholds to be applied in the case in which an external call is made to the targeted subservice.

Even if the pre-call thresholds are met, and the external call actually sent to the target subservice, the handling component can still optionally apply post-call thresholds. For instance, FIG. 4 illustrates a flowchart of a method 400 for enforcing post-call thresholds. This method 400 may be performed after or contemporaneous with the time that the external call is placed to the subservice (act 205 of FIG. 2). Again, the method 400 may be performed by the handling component 130 of FIG. 1.

Here, the post-call threshold(s) associated with the external call are identified (act 401). As an example, this post-call threshold may be that a response to the external call should be received without a certain time. In other words, the post-call threshold could be a timeout. Decision blocks 502 and 503 then operate in a cycle. That is, if there is no response to the external call received back from the subservice ("No" in the decision block 402), but the post-call threshold is not exceeded ("No" in decision block 403), then no action is needed except to continue to monitor for the response and threshold.

If a response is received ("Yes" in decision block 402), this means the response was received before any post-call threshold was exceeded. Accordingly, in that case (again "Yes" in decision block 402), the response to the external call is passed to the service that made the external call (act 404). If the threshold is exceeded ("Yes" in decision block 403), this means that the post-call threshold was exceeded prior to any response being received back from the subservice (and a response may never be received back from the subservice in some cases). Accordingly, in that case (again "Yes" in decision block 403), the handling component fails the external call (act 405).

The handling component 130 might perform the method 200 for each and every external call made by any of the services 110 to any of the subservices 120. Alternatively, the service that places the external call may select which of the external calls are to be subject to the method 200, and which are not. Thus, in cases in which the method 200 is not to be applied, the external call is simply passed along to the targeted subservice without the application of any pre-call or post-call thresholds.

In FIG. 3, the external call includes a construct 303 notifying that the method is to be performed on the second external call. As an example, the construct could be a wrapper that wraps the external call. Based on the presence or absence of the construct 303, the handling component knows whether or not to apply the method 200. When and if the handling component passes the external call to the targeted subservice, the handling component may pass a version of the external call that does not have the construct 303 (to avoid confusing the subservice with the construct 303).

Optionally, the handling component 130 may operate in a test mode. In the test mode, the threshold(s) are evaluated, but the external call is placed regardless of the result of the evaluation. In this case, the evaluation results are reported to the user. This is helpful to allow the user to design appropriate thresholds that are not triggered often during normal operation. After all, it is desirable that in normal operation, the external calls are made to the targeted subservice, and that the service receives a response to the external call. The thresholds should really only be exceeded when there is actual risk of overuse of the shared resources, and thereby risk of propagation of problems from one service or subservice throughout the entire system.

Because the principles described herein are performed in the context of a computing system, some introductory discussion of a computing system will be described with respect to FIG. 5. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 5:
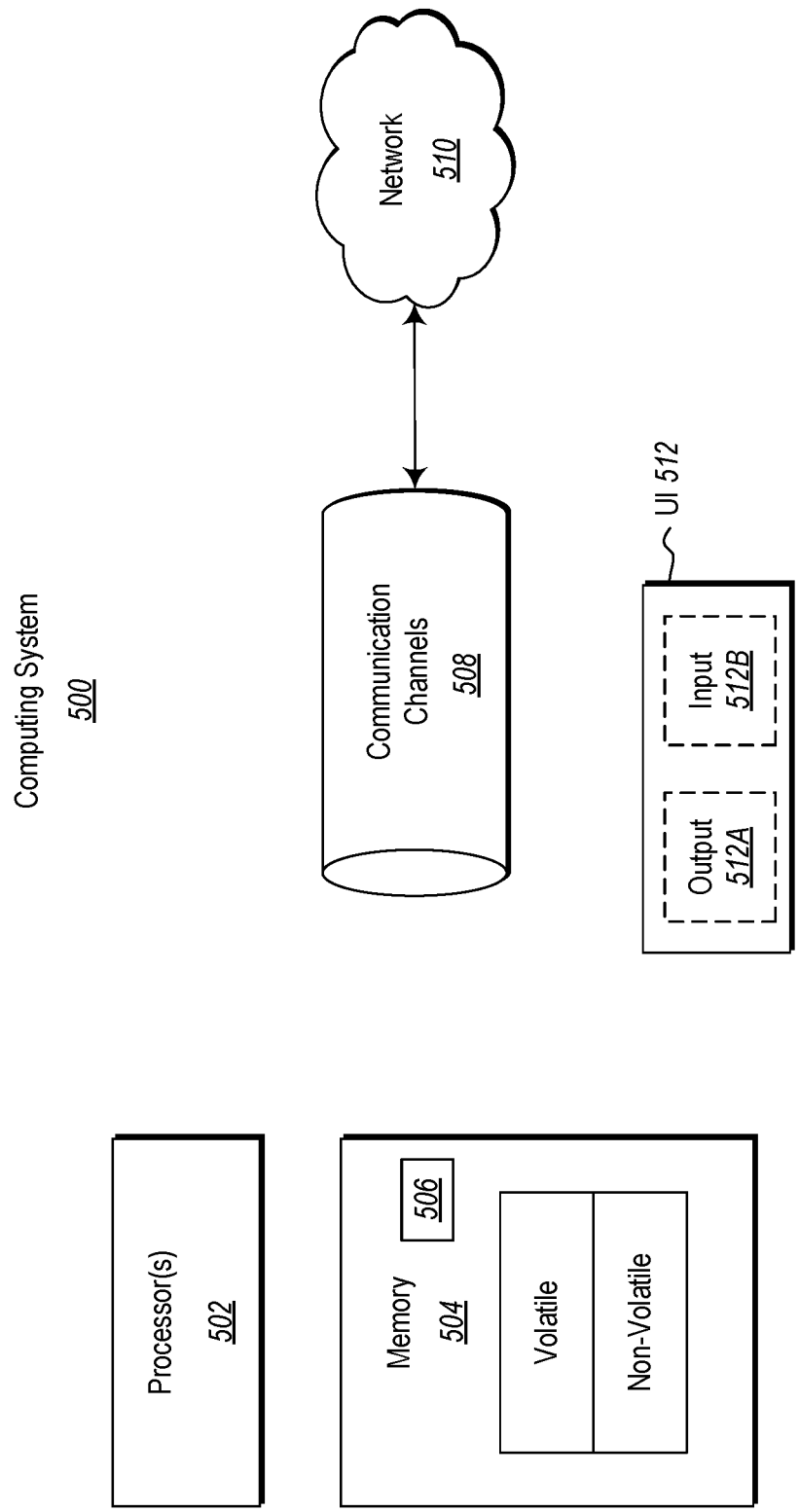
FIG. 5 illustrates an example computing system in which the principles described herein may be employed.

As illustrated in FIG. 5, in its most basic configuration, a computing system 500 includes at least one hardware processing unit 502 and memory 504. The processing unit 502 includes a general-purpose processor. Although not required, the processing unit 502 may also include a field programmable gate array (FPGA), an application specific integrated circuit (ASIC), or any other specialized circuit. In one embodiment, the memory 504 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 500 also has thereon multiple structures often referred to as an "executable component". For instance, the memory 504 of the computing system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 504 of the computing system 500. Computing system 500 may also contain communication channels 508 that allow the computing system 500 to communicate with other computing systems over, for example, network 510.

While not all computing systems require a user interface, in some embodiments, the computing system 500 includes a user interface system 512 for use in interfacing with a user. The user interface system 512 may include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, virtual or augmented reality, holograms and so forth. Examples of input mechanisms 512B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors; and
   one or more computer-readable media having thereon computer-executable instructions that are structured such that, if executed by the one or more processors, the computing system would be configured to handle external calls by:
   intervening between a service making an external call and a subservice to which the external call is addressed such that upon detecting receipt of an external call, the computing system is caused to be configured to perform the intervention by being configured to perform the following:
      evaluating the external call against one or more pre-call thresholds to determine whether or not the one or more pre-call thresholds are met;
   if the determination is that a pre-call threshold of the one or more pre-call thresholds is not met, failing the external call without sending the external call to the subservice, the failing of the external call comprising communicating to the service that placed the external call that the external call has failed, and
   if the determination is that all of the one or more pre-call thresholds are met, sending the external call to the subservice.

2. The computing system in accordance with claim 1, the one or more pre-call thresholds comprising a concurrency threshold limiting a number of pending external calls that the service can make.

3. The computing system in accordance with claim 1, the one or more pre-call thresholds comprising a load shedding threshold.

4. The computing system in accordance with claim 3, the load shedding threshold being adjustable as the reliability of the subservice change.

5. The computing system in accordance with claim 1, the one or more pre-call thresholds comprising a concurrency threshold limiting a call rate of external calls that the service can make, the one or more pre-call thresholds also comprising a load shedding threshold that is based on the reliability of the subservice.

6. The computing system in accordance with claim 1, the computer-executable instructions being further structured such that the computing system would be caused to be configured to:
   apply a post-call threshold for the external call sent to the subservice.

7. The computing system in accordance with claim 6, the computer-executable instructions being further structured such that the computing system would be caused to be configured to:
   if the post-call threshold is satisfied, return a response from the subservice to the service that placed the external call; and
   if the post-call threshold is not satisfied, communicating to the service that placed the external call that the external call has failed.

8. A method for intervening between the service making the external call and the subservice to which the external call, the method comprising:
   detecting receipt of an external call from a service to a subservice;
   evaluating the external call against one or more pre-call thresholds to determine whether or not the one or more pre-call thresholds are met;
   determining that a pre-call threshold of the one or more pre-call thresholds is not met; and
   in response to determining that the pre-call threshold is not met, failing the external call without sending the external call to the subservice, the failing of the external call comprising communicating to the service that placed the external call that the external call has failed.

9. The method in accordance with claim 8, the method further comprising:
   identifying the one or more pre-call thresholds based on an identity of the service that made the external call.

10. The method in accordance with claim 8, the external call being a first external call, the method further comprising:
    detecting receipt of a second external call from the service to the subservice;
    evaluating the external call against the second one or more pre-call thresholds to determine whether or not the second one or more pre-call thresholds are met;
    determining that all of the second one or more pre-call thresholds are met; and
    in response to determining that all of the second one or more pre-call thresholds are met, sending the second external call to the subservice.

11. The method in accordance with claim 10, further comprising:
applying one or more post-call thresholds to the second external call.

12. The method in accordance with claim 11, the one or more post-call thresholds comprising a timeout threshold by which a response to the second external call should be received from the subservice.

13. The method in accordance with claim 11, further comprising:
determining that any of the post-call thresholds have not been met for the second external call.

14. The method in accordance with claim 13, further comprising:
in response to determining that any of the post-call thresholds have not been met for the second external call, communicating to the service that placed the external call that the external call has failed.

15. The method in accordance with claim 10, the service that placed the first external call being different than the service placed the second external call, the first one or more pre-call thresholds having different values than the second one or more pre-call thresholds on the basis of the service that placed the respective calls being different.

16. The method in accordance with claim 10, the second external call received from the service including a construct notifying that the method is to be performed on the second external call.

17. The method in accordance with claim 16, the second external call sent to the subservice omitting the construct.

18. The method in accordance with claim 8, the one or more pre-call thresholds comprising a concurrency threshold limiting a number of simultaneously in-flight external calls that the service can make.

19. The method in accordance with claim 8, the one or more pre-call thresholds comprising a load shedding threshold.

20. A computer program product comprising one or more computer-readable storage media having thereon computer-executable instructions that are structured such that, if executed by one or more processors of a computing system, would cause the computing system to be configured to handle external calls by:

intervening between a service making an external call and a subservice to which the external call is addressed such that upon detecting receipt of an external call, the computing system is caused to be configured to perform the intervention by being configured to perform the following:

evaluating the external call against one or more pre-call thresholds to determine whether or not the one or more pre-call thresholds are met;

if the determination is that a pre-call threshold of the one or more pre-call thresholds is not met, failing the external call without sending the external call to the subservice, the failing of the external call comprising communicating to the service that placed the external call that the external call has failed, and if the determination is that all of the one or more pre-call thresholds are met, sending the external call to the subservice.

* * * * *